US007839826B2

(12) United States Patent
Promenzio et al.

(10) Patent No.: US 7,839,826 B2
(45) Date of Patent: *Nov. 23, 2010

(54) METHOD AND APPARATUS TO FACILITATE USE OF A SESSION INITIATION PROTOCOL INSTANCE TO SUPPORT ON-HOLD SESSION STATUS

(75) Inventors: Edgardo L. Promenzio, Round Lake, IL (US); Ajaykumar R. Idnani, Hoffman Estates, IL (US); Yi-Cheng Liu, Barrington, IL (US); Rajendra A. Panchal, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 283 days.

This patent is subject to a terminal disclaimer.

(21) Appl. No.: 11/299,429

(22) Filed: Dec. 12, 2005

(65) Prior Publication Data

US 2007/0133465 A1  Jun. 14, 2007

(51) Int. Cl.
*H04W 4/00* (2009.01)
(52) U.S. Cl. .................. 370/331; 370/329; 455/436; 455/437
(58) Field of Classification Search ................ 455/403, 455/422.1, 436–445; 370/310, 328–331
See application file for complete search history.

(56) References Cited

U.S. PATENT DOCUMENTS

| 6,167,432 | A | 12/2000 | Jiang |
| 7,379,968 | B2 | 5/2008 | Schuh |
| 7,409,218 | B2 | 8/2008 | Bonta |
| 2003/0145054 | A1 | 7/2003 | Dyke |
| 2004/0175830 | A1 | 9/2004 | Bowdish et al. |
| 2004/0249951 | A1 | 12/2004 | Grabelsky et al. |
| 2004/0264410 | A1* | 12/2004 | Sagi et al. .................. 370/331 |

(Continued)

FOREIGN PATENT DOCUMENTS

WO    2005064883 A1    7/2005

OTHER PUBLICATIONS

Koskelainen, P. et al.: "Requirements for Floor Control", draft-koskelainen-mmusic-floor-req-01.txt, Internet Engineering Task Force, Internet Draft, Oct. 31, 2002, Expires May 2003, pp. 1-9.

(Continued)

*Primary Examiner*—Lester Kincaid
*Assistant Examiner*—Mehmood B Khan (57) ABSTRACT

During (101) a communication session for a plurality of user platforms wherein at least one of the user platforms is on hold and wherein the communication session is presently occurring in a first network and is terminable by a Session Initiation Protocol server as comprises a part of that first network, one establishes (102) in the first network a Session Initiation Protocol instance as corresponds to the communication session wherein the Session Initiation Protocol instance comprises, at least in part, session context information for the user platform that is on hold. Then, following a handoff of bearer support of the communication session from the first network to a second network, one uses (104) the Session Initiation Protocol instance to maintain the hold status of the user platform that is on hold with the Session Initiation Protocol server subsequent to the handoff such that the Session Initiation Protocol server does not terminate the communication session.

11 Claims, 3 Drawing Sheets

U.S. PATENT DOCUMENTS

| | | |
|---|---|---|
| 2004/0266426 A1 | 12/2004 | Marsh et al. |
| 2005/0036509 A1 | 2/2005 | Acharya et al. |
| 2005/0047582 A1 | 3/2005 | Shaffer et al. |
| 2005/0074111 A1 | 4/2005 | Hanson et al. |
| 2005/0119005 A1* | 6/2005 | Segal et al. ............... 455/445 |
| 2005/0124326 A1 | 6/2005 | Belkin et al. |
| 2005/0237978 A1* | 10/2005 | Segal ....................... 370/331 |
| 2005/0260976 A1 | 11/2005 | Khartabil et al. |
| 2005/0262249 A1 | 11/2005 | Koskelainen |
| 2005/0273510 A1 | 12/2005 | Schuh |
| 2006/0031290 A1 | 2/2006 | Mannaru et al. |
| 2006/0270447 A1* | 11/2006 | Everson et al. ............. 455/436 |

OTHER PUBLICATIONS

Khartabil, H. et al.: "The Conference Policy Control Protocol (CPCP)", draft-ietf-xcon-cpcp-01.txt, XCON, Internet-Draft, Expires Apr. 12, 2005, pp. 1-38.

* cited by examiner

```
┌─────────────────────────────────┐
│ DURING A COMMUNICATION SESSION FOR A │
│ PLURALITY OF USER PLATFORMS (WHEREIN │
│ AT LEAST ONE IS ON HOLD) AS IS      │─── 101
│ PRESENTLY OCCURRING IN A 1st NETWORK │
│ AND IS TERMINABLE BY AN SIP SERVER  │
│ AS COMPRISES A PART THEREOF         │
└─────────────────────────────────┘
                 ↓
┌─────────────────────────────────┐
│ ESTABLISH IN THE 1st NETWORK    │
│ AN SIP INSTANCE CORRESPONDING   │
│ TO THE COMMUNICATION            │─── 102
│ SESSION COMPRISING SESSION      │
│ CONTEXT INFORMATION FOR         │
│ THE USER PLATFORM ON HOLD       │
└─────────────────────────────────┘
                 ↓
            ╱ BEARER  ╲  NO
           ╱  SUPPORT  ╲─────→
           ╲  HANDOFF  ╱─── 103
            ╲         ╱
                 ↓ YES
┌─────────────────────────────────┐
│ USE THE SIP INSTANCE TO         │
│ MAINTAIN THE USER               │
│ PLATFORM HOLD STATUS WITH       │─── 104
│ THE SIP SERVER SUBSEQUENT       │
│ TO THE HANDOFF                  │
└─────────────────────────────────┘
                 ↓
┌─────────────────────────────────┐
│ USE THE SESSION CONTEXT         │
│ INFORMATION TO EFFECT, VIA      │
│ THE SIP SERVER, CHANGING        │─── 105
│ THE USER PLATFORM ON HOLD       │
│ TO ACTIVE STATUS                │
└─────────────────────────────────┘
                 ↓
┌─────────────────────────────────┐
│ USING THE SESSION CONTEXT       │
│ INFORMATION TO EFFECT VIA       │
│ THE SIP SERVER, CHANGING        │─── 106
│ AN ACTIVE USER PLATFORM         │
│ TO BEING ON HOLD                │
└─────────────────────────────────┘

/ # METHOD AND APPARATUS TO FACILITATE USE OF A SESSION INITIATION PROTOCOL INSTANCE TO SUPPORT ON-HOLD SESSION STATUS

RELATED APPLICATIONS

Two co-pending applications as were filed on even date herewith contain related subject matter (the full contents of which are incorporated herein by this reference). These two co-pending applications are:

U.S. patent application Ser. No. 11/299,430 entitled METHOD AND APPARATUS TO FACILITATE PERSISTENCE OF A HANDED-OFF COMMUNICATION SESSION bearing;

U.S. patent application Ser. No. 11/301,143 entitled METHOD AND APPARATUS TO FACILITATE TRANSFERRING CHAIRMANSHIP OF AN AD-HOC CONFERENCE CALL bearing.

TECHNICAL FIELD

This invention relates generally to communication networks and more particularly to hold functionality.

BACKGROUND

Communication networks of various kinds are known. A communication session typically comprises the facilitation of communications between two or more user platforms. In more recent times increased interest exists with respect to using Session Initiation Protocol (SIP)-based platforms to support and facilitate one or more aspects of such communication sessions. Using such an approach a Session Initiation Protocol server can be employed to support various communication session activities. For example, on-hold status for one or more user platforms can be supported in this manner.

Mobile user platforms are also known in the art. Such user platforms may comprise, for example, a personal device that a given user carries on their person. Such mobile user platforms may exhibit mobility before, during, and/or after a given communication session. Such mobility, of course, can lead to a need to hand off a given user platform from one network to another in order to ensure the provision of adequate communication connectivity.

At present, when a first communication network hands off a given user platform to a second communication network during the course of a communication session wherein at least one user platform is on hold with respect to that communication session and where that communication session is serviced by (and terminable by) a Session Initiation Protocol server as comprises a part of that first communication network, the on-hold user platform loses their status and are effectively lost to the communication session. This occurs at least in part because all Session Initiation Protocol dialogs terminate when a corresponding active user platform leaves the network as occurs during such a handoff. Though various mechanisms exist or have been proposed to maintain the active communication session itself, the call context comprising the on-hold status of one or more user platforms are lost.

This, of course, can present problems. In many cases a given user places another party on hold with every intention of returning to that call or to conference that held party in to the active session. Losing the ability to return to a held party of course frustrates such intentions. Furthermore, in many or most cases, the user receives no specific indication that a hand off has occurred. The user is therefore not only frustrated with respect to their intentions but have no information by which to ascertain the nature or cause of the failure.

BRIEF DESCRIPTION OF THE DRAWINGS

The above needs are at least partially met through provision of the method and apparatus to facilitate use of a session initiation protocol instance to support on-hold session status described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments and during a communication session for a plurality of user platforms wherein at least one of the user platforms is on hold and wherein the communication session is presently occurring in a first network and is terminable by a Session Initiation Protocol server as comprises a part of that first network, one establishes in the first network a Session Initiation Protocol instance as corresponds to the communication session wherein the Session Initiation Protocol instance comprises, at least in part, session context information for the user platform that is on hold. Then, following a handoff of bearer support of the communication session from the first network to a second network, one uses the Session Initiation Protocol instance to maintain the hold status of the user platform that is on hold with the Session Initiation Protocol server subsequent to the handoff such that the Session Initiation Protocol server does not terminate the communication session.

Depending upon the needs and/or requirements of a given application setting, these teachings further optionally provide for using the session context information for the user platform that is on hold to effect, via the Session Initiation Protocol server, changing the user platform that is on hold to a user platform that is actively engaged in the communication session notwithstanding that bearer support for the communication session has been handed off to the second network. As another option, one may use the session context information to effect, again via the Session Initiation Protocol server, changing a user platform that is actively engaged in the communication session to being on hold with respect to the communication session notwithstanding that bearer support for the communication session has been handed off to the second network.

These teachings are implementable in various ways. By one approach the aforementioned Session Initiation Protocol instance is established by, and resides within, a Session Initiation Protocol user agent proxy. The session context information can be sourced by any convenient and expedient source. For example, such information may be sourced, in whole or in part, by one or more of the user platforms as are engaged in the communication session or the Session Initiation Protocol server itself.

So configured, on-hold status for a given user platform can be preserved and transparently leveraged notwithstanding and subsequent to a handoff of an active user platform from a first network to a second network and notwithstanding the use and presence of a Session Initiation Protocol server in the first network that would otherwise terminate that on-hold status. Those skilled in the art will recognize and appreciate that these teachings can be deployed without requiring substitution or reprogramming of legacy network elements such as Session Initiation Protocol servers. Accordingly these teachings are deployable in a relatively convenient and cost effective manner.

Figure 1:
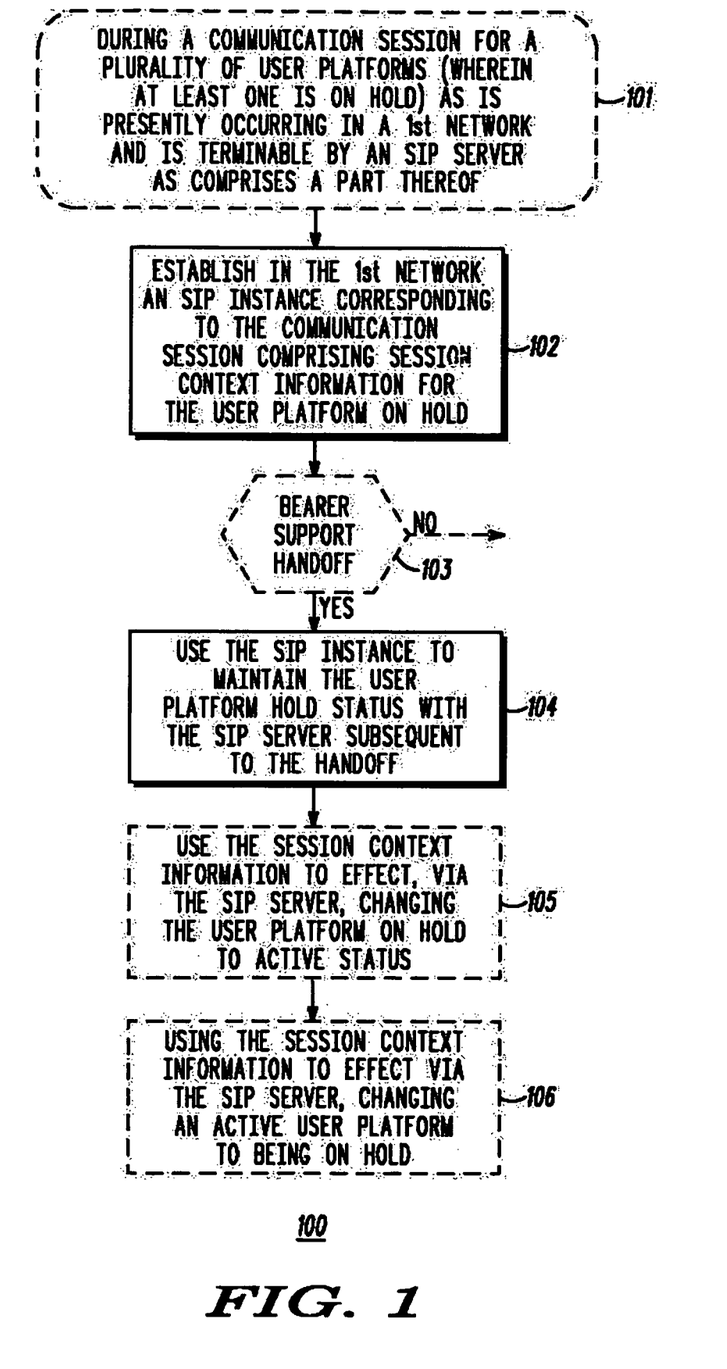
FIG. 1 comprises a flow diagram as configured in accordance with various embodiments of the invention.

These and other benefits may become clearer upon making a thorough review and study of the following detailed description. Referring now to the drawings, and in particular to FIG. 1, a corresponding process 100 presumes the existence 101 of a communication session for a plurality of user platforms wherein at least one of the user platforms is on hold. This communication session is further presumed to be occurring in a first network that comprises, at least in part, a Session Initiation Protocol server that has the capacity and authority to terminate this communication session. In particular, this Session Initiation Protocol server may be configured and arranged in a known manner to terminate all Session Initiation Protocol dialogs upon this first network handing off bearer support of such a communication session to another network. Those skilled in the art will understand and appreciate that these teachings are applicable regardless of whether the communication session was initiated by the user platform that is on hold or was initiated by a user platform other than the user platform that is presently on hold.

This process 100 then provides for establishing 102 in the first network a Session Initiation Protocol instance as corresponds to the communication session wherein the Session Initiation Protocol instance comprises, at least in part, session context information for the user platform(s) that is on hold (such that when more than one user platform is presently on hold, this step may provide for establishing corresponding session context information for each such user platform). This can be accomplished, for example, by establishing a Session Initiation Protocol user agent proxy and by provisioning that Session Initiation Protocol user agent proxy with session context information, at least in part, by transmitting to the Session Initiation Protocol user agent proxy the session context information from at least one of:

at least one of the plurality of user platforms; and the Session Initiation Protocol server itself.

Such establishment 102 can occur in an ongoing manner if desired. Or, if desired, such establishment 102 can occur in response to one or more predetermined triggers of choice. For example, detecting a specific preliminary indication that a handoff is likely to occur can be used as such a trigger.

The session context information itself can and will likely vary with the specifics of a given application setting. Examples of such information comprise, but are certainly not limited to:

an identifier for the user platform that is on hold;

an identifier for a user platform that presently has floor privileges;

an identifier for a user platform that initiated the communication session; and information regarding a relative communication priority as corresponds to the user platform that is on hold.

Thereafter, and following a handoff of bearer support for the communication session from the present network to another network (for example, where this process optionally provides for detecting 103 such bearer support handoff), this process 100 provides for using 104 the Session Initiation Protocol instance to maintain the hold status of the user platform that is on hold with the Session Initiation Protocol server such that the Session Initiation Protocol server does not terminate the communication session. This step, of course, prompts a result that is contrary to prior practice and expectations; i.e., notwithstanding bearer support handoff the Session Initiation Protocol server persists its support of the communication session.

So configured, held-call support can be facilitated when bearer support for a first user platform's active communication session is handed off to another network. This occurs at least in part by establishing a first network Session Initiation Protocol instance as corresponds to the active communication session wherein the latter comprises, at least in part, session context information for a user platform that is on hold with respect to the active communication session (with multiple such Session Initiation Protocol instances typically being established when a plurality of on-hold user platforms are present). Following a handoff of bearer support of the active communication session from the first network to a next network, these Session Initiation Protocol instances are then used to maintain the hold status of the user platforms that were on hold when handing off the active communication session. This use comprises use in conjunction with the Session Initiation Protocol server such that the latter does not terminate the held status of the user platforms that were on hold with respect to the active communication session at the time of the handoff.

In addition to facilitating persistence of the on-hold status of such user platforms, this process 100 may be further leveraged if desired. For example, such session context information can be used 105 to effect, via the Session Initiation Protocol server, changing the user platform that is on hold to a user platform that is actively engaged in the communication session notwithstanding, again, that bearer support for the communication session has been handed off to the second network. This will permit, for example, a given user platform to access a held user platform and to convert that user platform to active participation in an active communication session.

As another example, and with continued reference to FIG. 1, this session context information can be optionally used 106 to effect, via the Session Initiation Protocol server, changing a user platform that is actively engaged in the communication session to being on hold with respect to the communication session (again notwithstanding that bearer support for the communication session has been handed off to the second network). To illustrate, the Session Initiation Protocol server can be used to convert a user platform that is active with respect to the active communication session to held status instead.

If desired, this can further comprise detecting termination of an active call as corresponds to the active communication session by a first user's platform while at least one user platform remains on hold with respect to the active communication session and then automatically alerting the first user's platform (by facilitating, for example, triggering of an annunciator (such as a ringback) at the first user's platform (where the annunciator can comprise essentially any alert mechanism including but not limited to visual alerts, audible alerts, haptic alerts, and so forth)) regarding the at least one user platform that remains on hold with respect to the active communication session.

Figure 2:
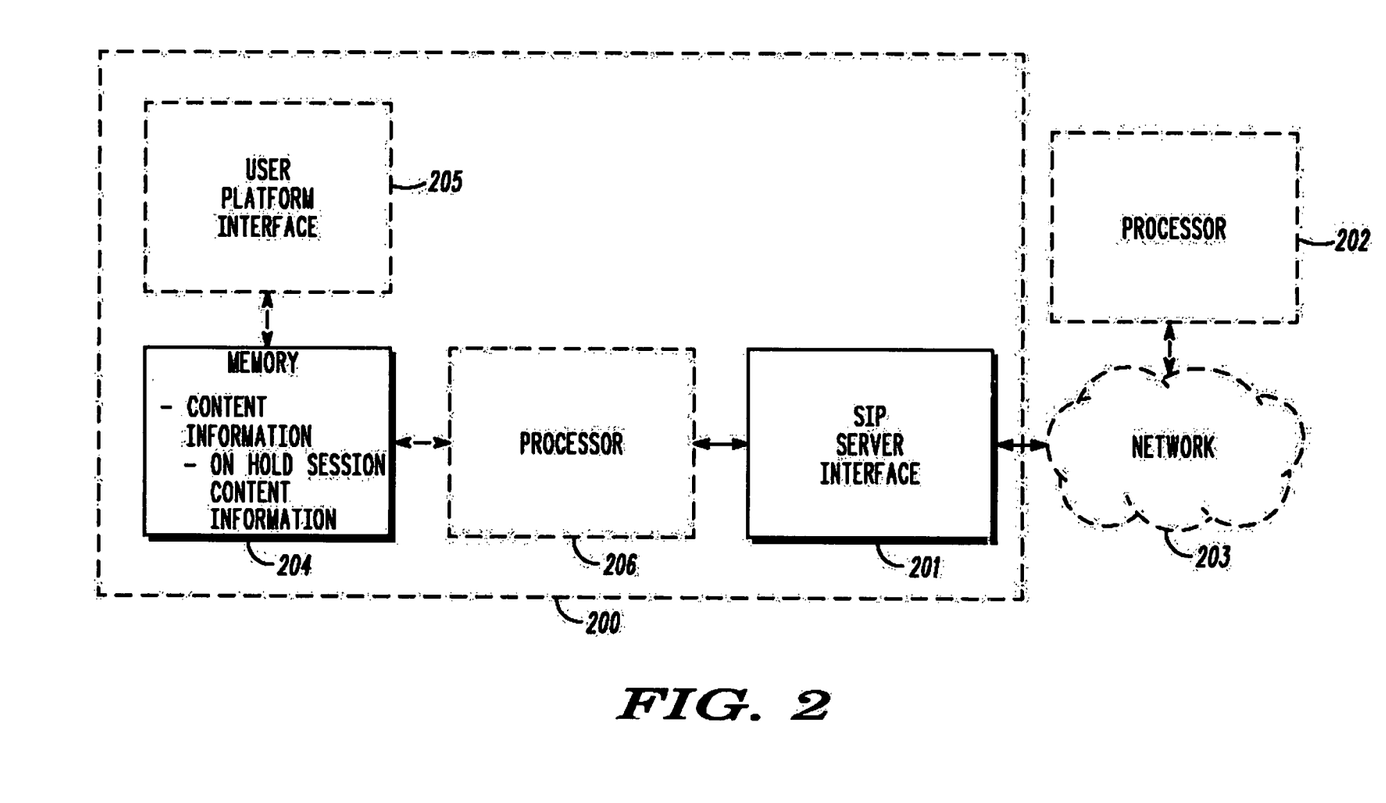
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

The depicted apparatus 200, which can comprise, for example, a Session Initiation Protocol user agent proxy as noted above and having a Session Initiation Protocol server interface 201 to permit compatible interaction with a Session Initiation Protocol server 202 (via, for example, an intervening network 203 of choice). So configured, the apparatus 200 can interact with the Session Initiation Protocol server 202 to effect the teachings presented above.

This illustrative example of an apparatus 200 further comprises a memory 204 having stored therein context information as corresponds to an active communication session for a first user platform. By one approach this context information comprises, at least in part, session context information for at least one user platform as has on-hold status with respect to an active communication session. Such information may have been obtained, for example, from the Session Initiation Protocol server 202 and/or one or more user platforms (via, for example, a user platform interface 205 as can operably couple to the memory 204 to permit receipt of such information).

By one approach this apparatus 200 can further optionally comprise a processor 206 that couples to the Session Initiation Protocol server interface 201 and the memory 204. This processor 206 can be programmed, for example, to effect one or more of the actions set forth by these teachings. For example, the processor 206 can serve to use the stored session context information in interactions with the Session Initiation Protocol server 202 in a manner that prevents the latter from terminating the communication session even when bearer support for that communication session is handed off from the network that includes the Session Initiation Protocol server 202 to another network that does not include the Session Initiation Protocol server 202.

As another example, the processor 206 can serve to use the stored session context information to effect, via the Session Initiation Protocol server, changing a user platform that is on hold to a user platform that is actively engaged with respect to a communication session. As another example, the processor 206 can serve to use the stored session context information to effect, via the Session Initiation Protocol server, to generally effect the opposite; i.e., changing a user platform that is actively engaged with respect to a communication session to a user platform that is on hold with respect thereto.

As yet another example, the processor 206 can serve to detect a return of bearer support of an active communication session to the network that includes the Session Initiation Protocol server 202 and, in response thereto, to provision the returning user platform with session context information as corresponds to the held status of those user platforms that are on hold with respect to the returning active communication session.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 3:
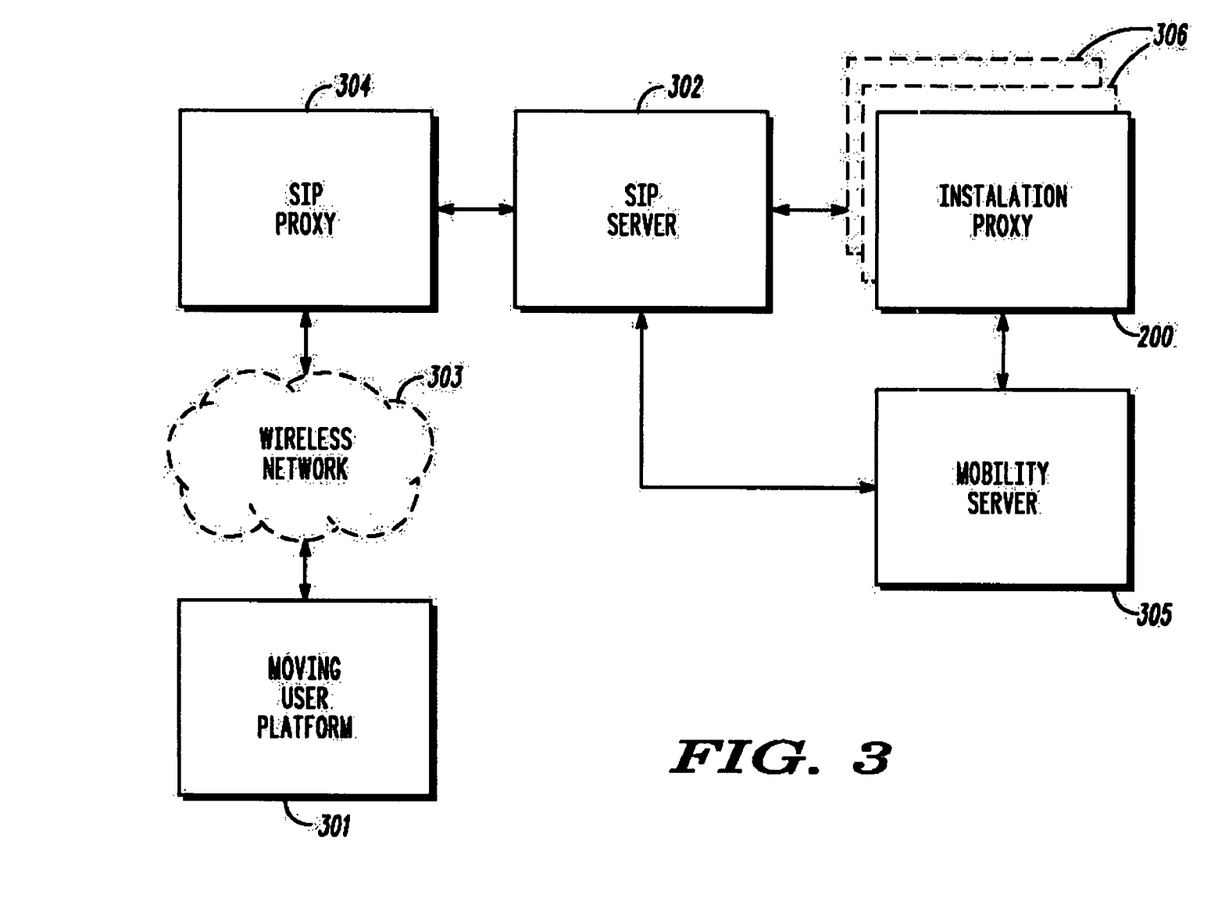
FIG. 3 comprises a block diagram as configured in accordance with various embodiments of the invention.

Turning now to FIG. 3, a more particular illustrative example will be described. In this illustrative example, a moving user platform 301 is engaged in an active communication session. This activity includes an active dialog with a corresponding Session Initiation Protocol server 302 (via, for example, a wireless network 303 of choice and a Session Initiation Protocol proxy 304 as are known in the art). This active dialog comprises, in this illustrative example, dialog regarding at least one held call. As the moving user platform 301 moves it begins to move out of the coverage area as corresponds to this network. When this occurs and as will be well understood by those skilled in the art, the moving user platform 301 initiates a handover procedure with a corresponding mobility server 305 (via, for example, the Session Initiation Protocol server 302).

In this example, this initiation of a handover procedure also triggers having the moving user platform 301 deliver the context for the current and held calls to the mobility server 305 along with, for example, an instruction to the latter to establish a Session Initiation Protocol instance for each such call. The mobility server 305, in turn, requests an instantiation proxy 200 to create the corresponding instances 306. So configured, the instantiation proxy 200 establishes a Session Initiation Protocol instance 306 for each user platform as comprises a part of the active communication session including on-hold user platforms.

By one approach, the mobility server 305 can next instruct the Session Initiation Protocol server 302 to effectively replace its dialog with the moving user platform with that of a corresponding one of the newly created instances (i.e., the Session Initiation Protocol instance as corresponds to the active call itself). As a result, the dialog the Session Initiation Protocol server 302 requires in order to persist and not terminate the session will continue to the satisfaction of the Session Initiation Protocol server notwithstanding that the moving user platform 301 hands off at least temporarily to another network.

By another approach, the instantiation proxy 200 can itself invite the Session Initiation Protocol server 302 to replace the original dialog for the new dialog. Such a transaction is already documented and well understood in the art.

These teachings provide an efficient and powerful mechanism for permitting various active and held call management activities. To illustrate, consider the following example where a mobile station is maintaining an active call and one held call via a wide area network and where the bearer for the active call is maintained directly with a Session Initiation Protocol server. Each such call is maintained as a different instance in the corresponding wireless local area network. In this example, the mobile station now decides to put the active call on hold and to recover the on-hold call.

The mobile station can send a request to make the indicated change to a corresponding mobility Session Initiation Protocol server in the wireless local area network via a wide area provider network. This request will be routed through the wide area network to the Session Initiation Protocol mobility server via, for example, a tightly coupled link with the wireless local area network.

The Session Initiation Protocol mobility server then constructs a request to an instantiation proxy in order to switch the status of the first call to being on-hold and the status of the held call to being active. The Session Initiation Protocol mobility server can also request the call context information as corresponds to the held call at this time as well. The instantiation proxy will effect the requested change and provide the held call context information to the Session Initiation Protocol mobility server. The latter can use the received held call context information to construct and send a request to the Session Initiation Protocol server to put the first call on hold and to change the held call to active status.

The Session Initiation Protocol server can perform these changes and prepare to modify the bearer media accordingly while also acknowledging these changes to the Session Initiation Protocol mobility server. The latter can then send a successful confirmation regarding the call change request to the mobile station.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising, during a communication session for a plurality of user platforms wherein at least one of the user platforms is on hold, for which communication session is presently occurring in a first network and wherein the communication session can be terminated by a Session Initiation Protocol server as comprises a part of that first network:

establishing in the first network a Session Initiation Protocol instance as corresponding to the communication session wherein the Session Initiation Protocol instance comprises, at least in part, session context information for the user platform that is on hold;

following a handoff of bearer support of the communication session from the first network to a second network, using the Session Initiation Protocol instance to replace the user platform in the first network and to maintain the hold status of the user platform that is on hold with the Session Initiation Protocol server subsequent to the handoff such that the Session Initiation Protocol server does not terminate the communication session; and using the session context information for the user platform that is on hold to effect, via the Session Initiation Protocol server, changing the user platform that is on hold to a user platform that is actively engaged in the communication session notwithstanding that bearer support for the communication session has been handed off to the second network.

2. The method of claim 1 wherein the communication session comprises a plurality of user platforms that are on hold and wherein establishing in the first network a Session Initiation Protocol instance further comprises forming a plurality of Session Initiation Protocol instances with at least one such Session Initiation Protocol instance for each of the plurality of user platforms that are on hold.

3. The method of claim 1 wherein establishing in the first network a Session Initiation Protocol instance comprises establishing a Session Initiation Protocol user agent proxy.

4. The method of claim 3 wherein establishing a Session Initiation Protocol user agent proxy comprises provisioning the Session Initiation Protocol user agent proxy with session context information, at least in part, by transmitting to the Session Initiation Protocol user agent proxy the session context information from at least one of:

at least one of the plurality of user platforms;
the Session Initiation Protocol server.

5. The method of claim 1 further comprising:

using the session context information to effect, via the Session Initiation Protocol server, changing a user platform that is actively engaged in the communication session to being on hold with respect to the communication session notwithstanding that bearer support for the communication session has been handed off to the second network.

6. The method of claim 1 wherein the communication session was at least one of:

initiated by the user platform that is on hold;
initiated by a user platform other than a user platform that is presently on hold.

7. A method to facilitate held-call support when bearer support for a first user platform's active communication session is handed off to another network, comprising:

establishing in a first network Session Initiation Protocol instances as correspond to the active communication session wherein the Session Initiation Protocol instances comprise, at least in part, session context information for user platforms that are on hold with respect to the active communication session;

following a handoff of bearer support of the active communication session from the first network to the another network, using the Session Initiation Protocol instances to replace the user platforms in the first network and to maintain held status of the user platforms that were on hold when handing off the active communication session via the Session Initiation Protocol server subsequent to handing off the active communication session such that the Session Initiation Protocol server does not terminate the held status of the user platforms that were on hold with respect to the active communication session; and using the Session Initiation Protocol server to convert the held status of a user platform that is on hold with respect to the active communication session to active status with respect to the active communication session, notwithstanding that bearer support of the active communication session has been handed off to the another network.

8. The method of claim 7 wherein establishing in a first network Session Initiation Protocol instances as correspond to the active communication session comprises establishing a Session Initiation Protocol user agent proxy.

9. The method of claim 7 further comprising:

using the Session Initiation Protocol server to convert a user platform that is active with respect to the active communication session to held status with respect to the active communication session, notwithstanding that bearer support of the active communication session has been handed off to the another network.

10. The method of claim 9 further comprising:

detecting termination of an active call as corresponds to the active communication session by the first user's platform while at least one user platform remains on hold with respect to the active communication session;

automatically alerting the user's platform regarding the at least one user platform that remains on hold with respect to the active communication session.

11. The method of claim 10 wherein automatically alerting the first user's platform regarding the at least one user platform that remains on hold with respect to the active communication session comprises at least one of:
  facilitating triggering of an annunciator at the first user's platform;
  facilitating transmission of a corresponding message to the first user's platform;
  facilitating transmission of a command from a multi-network user platform to the
  Session Initiation Protocol server to convert a held call into an active state.

* * * * *

UNITED STATES PATENT AND TRADEMARK OFFICE
CERTIFICATE OF CORRECTION

| | | |
|---|---|---|
| PATENT NO. | : 7,839,826 B2 | |
| APPLICATION NO. | : 11/299429 | |
| DATED | : November 23, 2010 | |
| INVENTOR(S) | : Promenzio et al. | |

It is certified that error appears in the above-identified patent and that said Letters Patent is hereby corrected as shown below:

ON THE FACE PAGE

On Page 2, in Field (56), under "U.S. PATENT DOCUMENTS", in Column 2, Line 3, delete "455/436" and insert -- 455/552.1 --, therefor.

IN THE DRAWINGS

In Fig. 3, Sheet 3 of 3, for Tag "200", Line 1, delete "INSTALATION" and insert -- INSTANTIATION --, therefor.

IN THE CLAIMS

In Column 10, Lines 3-4, in Claim 11, delete "Session.....active site.", and insert the same at Line 2, after "to the", as a continuation of the claim.

Signed and Sealed this
Twenty-ninth Day of May, 2012

David J. Kappos
*Director of the United States Patent and Trademark Office*